July 19, 1932.  A. H. SWEET  1,868,183
METHOD OF PREPARING FOODS
Filed Sept. 16, 1929
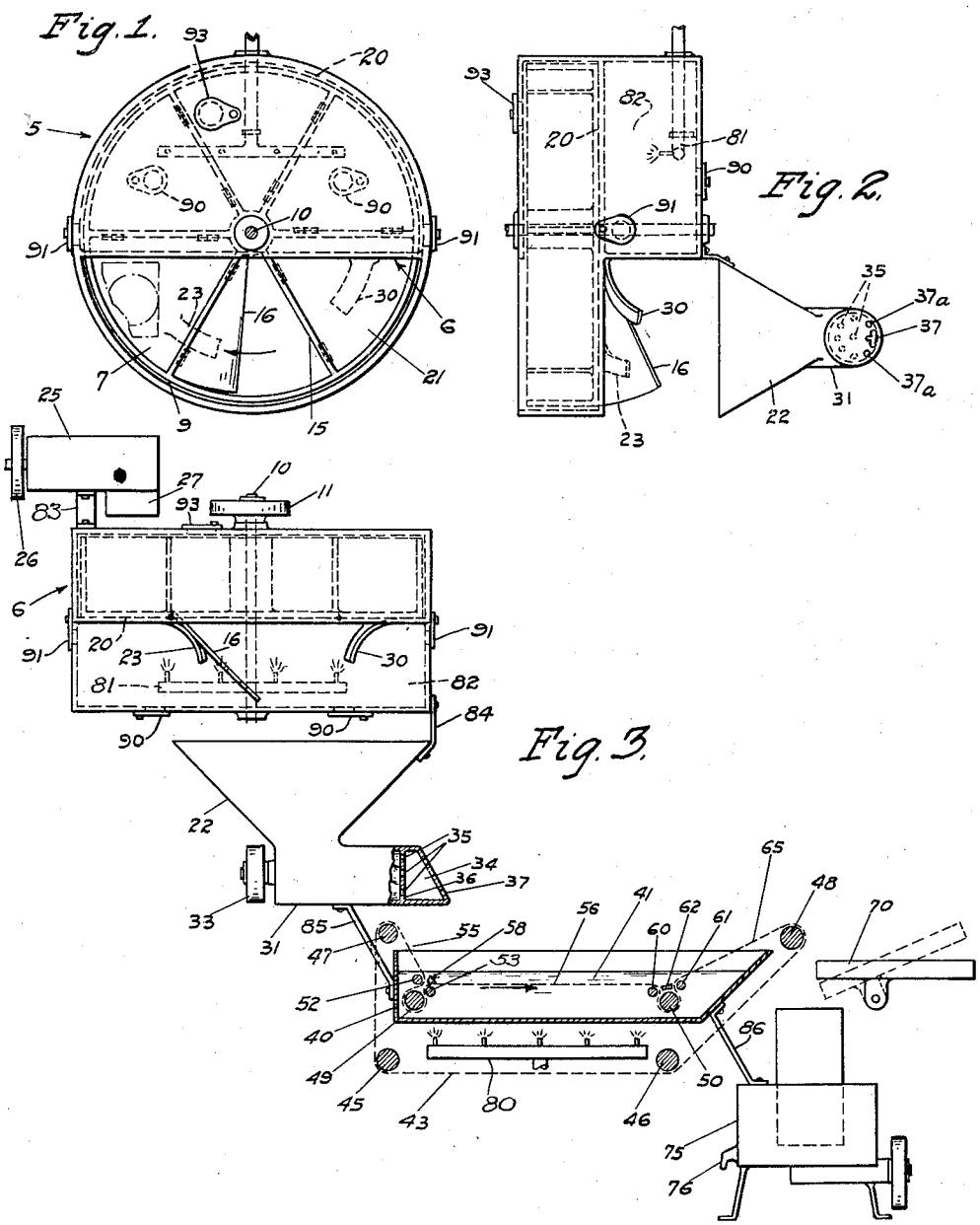
INVENTOR.
Alvin H. Sweet
BY
Robt. W. Pearson
ATTORNEY.

Patented July 19, 1932

1,868,183

UNITED STATES PATENT OFFICE

ALVIN H. SWEET, OF LOS ANGELES, CALIFORNIA, ASSIGNOR OF ONE-THIRD TO CHAUNCEY A. ALEXANDER AND ONE-THIRD TO ROBERT D. PEARSON, BOTH OF LOS ANGELES, CALIFORNIA

METHOD OF PREPARING FOODS

Application filed September 16, 1929. Serial No. 392,882.

This invention relates to an improved method for preparing and pre-cooking foods, and to an apparatus for carrying out said method.

An object of the invention is to prepare, from potatoes and from other starchy raw foods, a cooked food product which will keep fresh, crisp and palatable regardless of climate for a longer period of time than has heretofore been possible with regard to prepared foods of its class.

Another object of this invention is to provide an improved method and means for extracting the liquid in which the material is cooked from the cooked material more completely so that the finished product is delivered free from the grease used in cooking and is in a crisp, dry, attractive condition.

Still another object of the invention is to avoid over-cooking, thus conserving the vitamines, the product being at the same time kept free from objectionable preservatives and chemicals or substances forbidden by the pure food laws.

This product can be manufactured from peeled potatoes, or if a health product is wished may be made from whole potatoes including the skins.

Sweet potatoes, artichokes, and other starchy root vegetables, or starchy vegetables capable of being sliced, may be subjected advantageously to this newly invented process.

Other objects and advantages may hereinafter appear.

Referring to the accompanying drawing which illustrates, by way of example and in a diagrammatic form, an apparatus suitable for carrying out my improved method, Fig. 1 is a plan view of the oven and related parts.

Fig. 2 is a side elevation of the oven including the hopper into which the material falls.

Fig. 3 is a side elevation showing not only the oven and hopper but including therewith the remaining portion of the apparatus.

Referring in detail to the drawing, the circular casing 5, as viewed in plan, has a little more than half of its space occupied by a segmental oven 6, the remainder of the space within said casing as seen in plan being occupied by the compartments 7 and 7a. A horizontal circular platform 9 fixed to upright shaft 10 is arranged slowly to convey through said oven the material cooked therein, a driving pulley 11 being fixed to said shaft 10 to provide means for rotating said platform.

Said platform 9 comprises radial partitions 15 and triangular doors 16 hinged to said partitions and arranged to discharge the material from the platform after it has traveled through the oven and been therein subjected to the first cooking operation. The bottom of the oven is provided with a wall 20 over which the segmental doors 16 travel, said oven bottom wall also underlying the space 7, but an opening 21 being provided where each of the doors 16 are permitted to fall down to open position to discharge the cooked substance into the hopper 22, after which each door 16 is drawn over an inclined guide arm 23 which restores it to the normal horizontal position. Said doors 16 when closed cover correspondingly shaped openings in the platform 9. This construction permits the uncooked material to be dropped into the compartment 7 and thence be conveyed into the oven to be cooked.

Above the compartment 7 is a slicer 25 driven by a pulley 26 and having a downwardly directed discharge spout 27 positioned to direct the sliced material into the compartment 7 thence to be conveyed into the oven by the rotating platform 9.

A downwardly directed arm 30 may be provided to cause each of the doors 16 to open smoothly as they drop the materials after cooking into hopper 22. From hopper 22 the cooked materials are delivered to the casing 31 of the grinder which is driven by a pulley 33 and which has a delivery compartment 34. The material after being ground is forced into compartment 34 through a plurality of openings 35 in a partition 36. From the compartment 34 leads a delivery port 37 through which the ground material is forced in a shoe string or small sausage-like form, in which form it drops into the cooking vat or tank 40.

Said tank 40 contains a body of oily liquid 41 in which is submerged the upper run of an endless conveyor 43. Outside of tank 40 said conveyor is provided with the lower guide rollers 45 and 46 and with the upper guide rollers 47 and 48. From said upper guide rollers said conveyor 43 is led beneath rollers 49 and 50 which are submerged in the liquid 41 and are preferably located on pivots (not shown) near the bottom of the tank.

In order to prevent the materials from becoming clogged where the conveyor passes around the rollers 49 and 50 there are provided guard rollers 52 and 53 for the roller 49, said guard rollers being positioned to cause the material as it descends down the run 55 to pass directly upon the horizontal run 56, instead of allowing the descending material to become impacked between the conveyor and the lower side of the roller 49. A small bar 58 may be provided between the rollers 52 and 53 to guide the material more safely along its forward course. At the other side of the tank the small rollers 60 and 61 cooperate with the roller 50, and the guide bar 62 is provided between them to insure that the material is directed upwardly on to the inclined delivery run 65 from which it is conveyed over the roller 48 and is discharged on to the dump table 70.

The dump table 70 is at intervals operated to discharge the cooked and fried material which accumulates thereon into the centrifugal machine 75 wherein the oily liquid is separated by a well known rapidly rotating centrifugal element and such liquid is then discharged through the spout 76.

Under the tank 40 is a burner 80 which supplies the required temperature to the oil within said tank. The oven 6 is heated by a burner 81.

The various mechanical elements for carrying out my improved process are assembled in the proper succession and maintained in the proper relation to each other in the proper relative positions to provide for a continuous forward movement of the starchy food substance being operated upon until it passes through the final step of the process.

In the drawing I have shown the slicer 25 supported upon and slightly above the oven 6 by means of an upright bracket 83, the grinder 31 being connected to the oven element by a metal strap 84, said grinder, in turn, being mounted upon a bracket 85 the lower end of which is secured to the tank 40. The tank 40 is in turn maintained in a proper position with relation to the centrifugal machine 75 by means of a brace or bracket 86. It is to be understood that the various connecting elements 83, 84, 85 and 86 are intended merely for diagrammatic representations of any suitable frame work to maintain the various parts of the apparatus in proper operative relations to each other.

The temperature of the body of lard or other grease in tank 40 is desirably maintained at about 275° F., or somewhat higher. It should not much exceed 300° F., because a temperature higher than that will cause the oily content of the finished product to deteriorate.

The part 6 has been called an oven, but it is to be understood that the treatment which the material receives therein is not ordinary baking but may more properly be termed the sweating step of the process, and the part 6 a sweating compartment. Said compartment is made nearly air tight in order to produce more of a sweating than of a baking effect. During this step of the process potatoes lose only approximately one-sixteenth of their weight, showing that this step causes a breaking down of the starch cells and is not the usual dehydrating process.

When the potatoes are delivered from the slicer, as the slices fall on the revolving platform the cut surfaces adhere to each other, a considerable depth of the sliced material being permitted to accumulate owing to the relatively slow movement of the rotating platform. In this condition the mass of sliced potatoes passes into the oven and is heated therein for a period of about ten minutes, the temperature of the oven being maintained moderately hot. The result is that the slices are not dried out but the starch is caused to exude and remain between adhering cut surfaces in a more or less gummy condition. It has been discovered that when delivered to the oily liquid in this condition, and properly cooked therein, a superior final product is produced.

It has been discovered that by sweating the mass of sliced potatoes and in the manner stated as a step preparatory to cooking in the oily liquid and then forcing same thru holes so it comes out in a very attenuated form, the cooking in the oily liquid may be thereafter properly performed at a much lower temperature than has heretofore been deemed necessary. This is an important point because by this process a temperature of less than 300° of the oily liquid is sufficient and, therefore, the oily liquid which remains in the finished product is not deteriorated in the manner which results from using a higher temperature.

Although this process uses the low temperature of oily liquid mentioned, yet the final product is of a crisp, porous nature and is both palatable and attractive in appearance, and makes a finished product that will stay fresh and crisp for a length of time amply sufficient to provide for the marketing and consumption thereof.

The delivery of the material from the grinder to the tank in a thin or attenuated form is requisite in order to secure the best results, whether in a ribbon-like form or in the form of strings. The delivery port 37 of Figs. 2 and 3 is shown as a slot adapted to deliver a ribbon-shape strip of the material, and two round ports 37a are also shown in Fig. 2, in order to suggest that the attenuated product delivered from the grinder may be in round flat or otherwise shaped strings, as desired. The total area of the ports 35 leading into chamber 34 should be considerably greater than the total area of the outlet ports in order to maintain adequate pressure behind the delivered product.

The combustion chamber 82 is provided with air inlet devices 90 and with air outlet devices 91. The oven is provided in its top wall with an adjustable moisture venting device 93.

I claim:

1. The method of preparing a food product of starchy material which consists in slicing, permitting the cut surface of the slices to adhere to each other, applying sufficient heat to said adhering slices to cause a part of the starch therein to exude from the surfaces cut in slicing, grinding the adhering slices, converting them after grinding to an attenuated form, then introducing the attenuated material into an oily liquid and further cooking it therein, and finally removing excess oily liquid therefrom.

2. The method of preparing a food product of starchy material which consists in slicing, permitting the cut surfaces of the slices to adhere to each other, applying sufficient heat to said adhering slices to cause a part of the starch therein to exude between the surfaces cut in slicing, grinding the adhering slices, converting the ground material thus produced into relatively small masses, introducing said masses into an oily liquid and further cooking them therein at a temperature of less than approximately 300 degrees Fahrenheit, and finally removing excess oily liquid therefrom.

3. The method of preparing a food product of starchy material which consists in slicing, permitting the cut surface of the slices to adhere to each other, applying sufficient heat to said adhering slices to cause a part of the starch therein to exude from the surfaces cut in slicing, grinding the adhering slices, cooking in an oily liquid and finally removing excess oily liquid therefrom.

4. The method of preparing a food product of starchy material which consists in slicing, permitting the cut surface of the slices to adhere to each other, applying sufficient heat to said adhering slices to cause a part of the starch therein to exude from the surfaces cut in slicing, grinding the adhering slices, cooking in an oily liquid at a temperature of less than approximately 300° Fahrenheit, and finally removing excess oily liquid therefrom.

In testimony whereof I hereunto affix my signature.

ALVIN H. SWEET.